Figure 1:
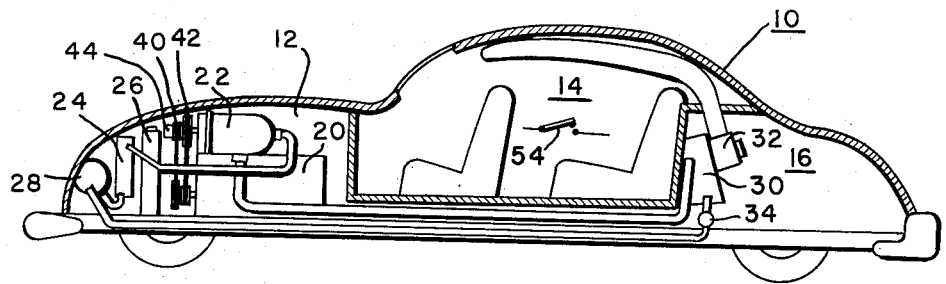

Feb. 19, 1957

J. W. JACOBS 2,781,642

AUTOMOBILE COOLING

Filed April 21, 1953

INVENTOR.
James W. Jacobs
BY
R. R. Candor
Attorney

United States Patent Office 2,781,642
Patented Feb. 19, 1957

---

2,781,642

AUTOMOBILE COOLING

James W. Jacobs, Dayton, Ohio, assignor to General Motors Corporation, Detroit, Mich., a corporation of Delaware Application April 21, 1953, Serial No. 350,185

13 Claims. (Cl. 62—4)

This invention relates to refrigerating apparatus and more particularly to an automobile air conditioning system provided with automatic controls.

It is an object of this invention to provide an automobile air conditioning system having means for automatically initiating operation of the cooling apparatus at a preselected time so as to make it possible to have one's car precooled after it has been sitting in the sun in a parking lot or the like and before it is necessary to go into the car to drive it away.

More particularly it is an object of this invention to provide an air conditioning system for an automobile wherein a clock may be used for starting up the air conditioning system a predetermined length of time before the car is to be used so as to precool and ventilate the car.

Another object of this invention is to provide means for controlling the speed of the compressor in accordance with changes in the car air temperature and engine speed.

Still another object of this invention is to provide a time controlled means for initiating operation of the air conditioning equipment in an unoccupied vehicle which includes an interlocking means for rendering the automobile non-driveable until the operator uses a key for rendering the car operative.

More particularly it is an object of this invention to provide means for automatically starting a car engine at a predetermined time only if the transmission shift lever is locked in "park" or "neutral" position so as to prevent any unauthorized or undesired movement of the car.

Further objects and advantages of the present invention will be apparent from the following description, reference being had to the accompanying drawings, wherein a preferred form of the present invention is clearly shown.

Figure 2:
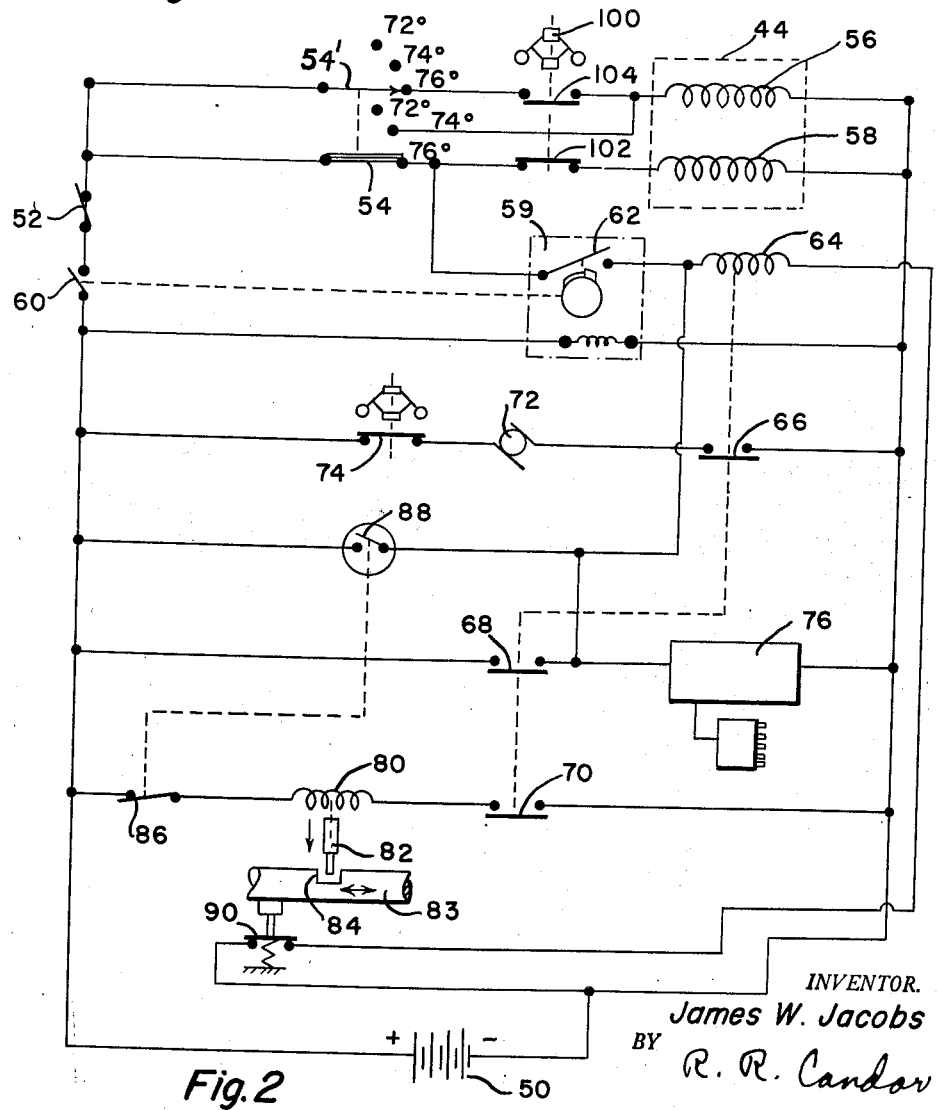

In the drawings:

Figure 1 is a vertical sectional view largely diagrammatic showing an automobile equipped with my improved form of air conditioning system; and, Figure 2 is a diagrammatic view showing the controls for the air conditioning equipment shown in Figure 1.

Referring now to the drawings wherein a preferred embodiment of the invention has been shown, reference numeral 10 generally designates an automobile having an engine compartment 12, a passenger compartment 14, and a trunk compartment 16. The main car engine 20 is used for driving a refrigerant compressor 22 which is mounted in the engine compartment as shown.

The refrigerant compressor 22 forms a part of a conventional volatile refrigerant system which includes a condenser 24 mounted in front of the engine radiator 26, a liquid refrigerant receiver 28 and an evaporator unit 30 located in the trunk compartment. A blower 32 is used for circulating air to be conditioned to and from the passenger compartment in accordance with standard automobile air conditioning practice. Refrigerant flow connections are provided between the compressor, condenser, receiver and evaporator assembly and these connections include a valve 34 for controlling the flow of refrigerant to the evaporator in accordance with standard practice.

The variable speed of the car engine produces two problems; inability to produce enough refrigeration at low motor speeds to do the job; and excess capacity at high motor speeds which throws the compressor capacity and evaporator capacity out of balance. To overcome these problems two separate belt drives are used to provide different speed ratios. In the system illustrated power is transmitted from the car engine 20 to the compressor 22 through either one of two belt drives 40 and 42 which are controlled electrically in a manner to be more fully explained hereinafter. The belt drive 42 is designed to operate the compressor at a relatively slow speed in comparison to the speed at which the belt drive 40 would drive the compressor. Clutch means 44 which includes solenoids 56 and 58 selectively controls the two belt drives so as to select the desired speed ratio between the car engine and the compressor so as to compensate for differences in engine speed and differences in refrigeration requirements as explained more fully hereinafter.

Referring now to Figure 2 of the drawing wherein the controls for the air conditioning equipment shown in Figure 1 have been illustrated, reference numeral 50 designates the conventional car battery which would be kept charged by the usual car generating system (not shown). The air conditioning equipment includes a master switch 52 provided in the circuit as shown. This switch serves to energize the main air conditioning controls including a temperature responsive thermostat 54 which is adapted to respond to the refrigeration requirements within the passenger compartment of the automobile and which in turn controls the flow of current to the clutch operating solenoids 56 and 58. In the circuit as shown, thermostat 54 occupies the position which it would occupy at a passenger compartment air temperature of 76° F. or higher. At this temperature and with the car engine not operating, the circuit is ready to be closed through the high speed solenoid 58 whenever the clock operated switch 60 is closed.

A clock type of timer mechanism 59 is provided in the circuit as shown for making it possible to set the clock to automatically turn on the air conditioning equipment at any preselected time for any preselected period of time. For purposes of simplifying this application the clock has been shown diagrammatically. Timer clocks of this type are now well known in the prior art and have been used extensively for controlling ovens on electric ranges and for controlling many other types of devices. For a more complete description of timers of this general type, reference is hereby made to Patents 2,619,558 and 2,603,287 which show timers of the type which could be used for this purpose.

The timer 59 is so constructed and arranged that at a preselected time it will close the switches 60 and 62. This latter switch is arranged in series with a starting relay 64 which when energized closes the starter switch 66, the ignition switch 68 and a transmission locking control switch 70. The switch 66 is arranged in series with the conventional cranking motor 72 and the speed responsive switch 74. The speed responsive switch 74 serves to deenergize the cranking motor 72 when the car engine reaches a predetermined speed indicating that the engine has started. A conventional cranking limiter could be added if desired to limit the operation of the cranking motor in the event the car engine would fail to start. The switch 68 is connected in series with the standard car ignition system which has been designated by the reference numeral 76. The switch 70 is arranged in series with a solenoid coil 80 which operates the transmission locking bar 82 which is adapted to engage within a slot 84 provided in the transmission shift lever so as to lock the same in the "park" or "neutral" position at all times when the switches 70 and 86 are closed so as to prevent movement of the car when the car engine starts.

The switch 86 is mechanically connected to a switch 88 which is of the type which can only be operated by means of a special ignition key of the type normally used for energizing the starting relay for normal operation of the car. It will be noted that the switch 88 is arranged in series with the starting relay 64 so that by closing of the switch 88 it is possible to initiate operation of the cranking motor even though no refrigeration is called for. It will also be noted that closing of the switch 88 causes opening of the switch 86 so as to disengage the locking bar 80 from locking engagement with the transmission shift lever 83.

In order to prevent cranking of the main car engine at any time when the transmission shift lever is out of the "park" or "neutral" position, a switch 90 has been provided in series with the starting solenoid coil 64 so that it is impossible to energize the solenoid 64 at any time when the switch 90 is in the open position. The shift lever 83 has been shown in that position commonly called the "park" position wherein it is impossible for the car to move.

At such times when the cooling requirements are low or the car engine speed is much higher than that required for operating the compressor the solenoid 58 is deenergized and the solenoid 56 is energized so as to cause operation of the compressor at a relatively low speed. In order to control the compressor speed a speed responsive device 100 has been provided as shown for operating switches 102 and 104. This device responds to the speed of the main car engine and is so arranged that at low engine speeds the switch 102 closes the circuit leading to the solenoid 58 so that the compressor will be operated at highest speed. If, however, the thermostat 54 should move to the 74° contact indicating that the air conditioning requirements have been partially satisfied, it will close the circuit leading to the solenoid 56 so as to reduce the speed of the compressor relative to the speed of the car engine. At high car speeds the contact bar 102 will be moved to the open circuit position and the contact bar 104 will be moved to the closed position so that, irrespective of what the temperature may be in the car, the compressor will not operate at its highest possible speed as the car engine speed already will be so high that no useful purpose would be served in operating the compressor at its maximum possible speed.

The thermostat 54 has been shown schematically as a conventional bimetallic strip type of thermostat whereas in actual practice one would preferably use a snap-acting type. In the thermostat shown the upper contactor 54' moves in unison with the main thermostat 54 and the arrangement is such that contact is made to the contacts marked 76° at all temperatures above 76°. At temperatures between 76° and 74° contact is made to the contacts marked 74° and at temperatures below 74° the circuits are opened.

While the form of embodiment of the invention as herein disclosed constitutes a preferred form, it is to be understood that other forms might be adopted, as may come within the scope of the claims which follow.

What is claimed is as follows:

1. In combination with a vehicle having an engine for supplying power for propelling the vehicle, said engine having an ignition system including a manually operable ignition switch and a clock operated ignition switch arranged in parallel, means cooperating with said engine for cranking said engine in response to closing of either of said switches, air conditioning apparatus supported on said vehicle including a refrigerant compressor, power transmitting means between said engine and said compressor, transmission means on said vehicle for propelling said vehicle by said engine, a control lever for said transmission means, and means operatively interconnecting said ignition system, said engine, and said control lever for preventing closing of said clock operated ignition switch in one position of said control lever.

2. In combination with a vehicle having an engine for supplying power for propelling the vehicle, said engine having an ignition system including a manually operable ignition switch and a clock operated ignition switch arranged in parallel, means cooperating with said engine for cranking said engine in response to closing of either of said switches, air conditioning apparatus supported on said vehicle including a refrigerant compressor, power transmitting means between said engine and said compressor, transmission means on said vehicle for propelling said vehicle by said engine, a control lever for said transmission means, means operatively interconnecting said ignition system, said engine, and said control lever for preventing closing of said clock operated ignition switch in one position of said control lever, and interlock means for preventing movement of said control lever from said one position after closing of said clock operated ignition switch until subsequent closing of said manually operable ignition switch.

3. In combination with a vehicle having an engine for supplying power for propelling the vehicle, said engine including an ignition circuit, a refrigerating system supported on said vehicle including a compressor, power transmitting means drivingly connecting said engine and said compressor, said engine including a starter, said power transmitting means including means for at times connecting said compressor with said engine and for at times disconnecting said engine from said compressor in response to refrigeration requirements, and clock means operatively connected to said ignition circuit for closing said ignition circuit and initiating operation of said starter at a preselected time.

4. In combination with a vehicle having an engine for supplying power for propelling the vehicle, a refrigerating system including a compressor, power transmitting means drivingly connecting said engine and said compressor, a starter operatively connected to said engine for starting said engine, a control circuit operatively connected to said starter and including clock means for initiating operation of said starter at a preselected time, said power transmitting means comprising a multiple speed ratio drive means, and temperature responsive means operatively connected to said drive means for selecting the speed ratio of said drive means.

5. In a vehicle, a prime mover, an air conditioning unit for cooling air within said vehicle including a compressor, power transmitting means between said prime mover and said compressor, means including a clock for initiating operation of said prime mover at a preselected time, transmission means for driving said vehicle from said prime mover including a control means for preventing movement of said vehicle in one position of the control means, and interlock means operated by said control means for preventing said clock means from initiating operation of said prime mover in another position of said transmission control means.

6. In combination with a vehicle having an engine for supplying power for propelling the vehicle, said engine including an ignition circuit, a refrigerating system for said vehicle including a compressor, power transmitting means drivingly connecting said engine and said compressor, a starter for said engine operatively connected to said engine, clock means operatively connected in said ignition circuit for closing said ignition circuit and initiating operation of said starter at a preselected time, said vehicle including transmission means for propelling the same by means of power from said engine, and means preventing said clock means from initiating operation of said starter when said transmission means is engaged to propel said vehicle.

7. In combination with a vehicle having an engine for supplying power for propelling the vehicle, said engine including an ignition circuit, a refrigerating system for said vehicle including a compressor, power transmitting means drivingly connecting said engine and said compressor, a starter for said engine operatively connected to said engine, and clock means operatively connected in said ignition circuit for closing said ignition circuit and initiating operation of said starter at a preselected time, said power transmitting means comprising mechanism for varying the speed of said compressor relative to the speed of said engine.

8. In combination with a vehicle having an engine for supplying power for propelling the vehicle, said engine including an ignition circuit, a refrigerating system for said vehicle including a compressor, power transmitting means drivingly connecting said engine and said compressor, a starter for said engine operatively connected to said engine, and clock means operatively connected in said ignition circuit for closing said ignition circuit and initiating operation of said starter at a preselected time, said power transmitting means comprising mechanism for varying the speed of said compressor relative to the speed of said engine, and means responsive to the speed of said engine for controlling said mechanism.

9. In combination with a vehicle having an engine for supplying power for propelling the vehicle, said engine including an ignition circuit, a refrigerating system for said vehicle including a compressor, power transmitting means drivingly connecting said engine and said compressor, a starter for said engine operatively connected to said engine, and clock means operatively connected in said ignition circuit for closing said ignition circuit and initiating operation of said starter at a preselected time, said power transmitting means comprising mechanism for varying the speed of said compressor relative to the speed of said engine, means responsive to the speed of said engine for controlling said mechanism, and means responsive to refrigeration requirements for controlling said mechanism.

10. In combination with a vehicle having an engine for supplying power for propelling the vehicle, said engine including an ignition circuit, a refrigerating system for said vehicle including a compressor, power transmitting means drivingly connecting said engine and said compressor, a starter for said engine operatively connected to said engine, and clock means operatively connected in said ignition circuit for closing said ignition circuit and initiating operation of said starter at a preselected time, said power transmitting means comprising mechanism for varying the speed of said compressor relative to the speed of said engine, and means responsive to refrigeration requirements controlling said mechanism.

11. In a vehicle, a prime mover, an air conditioning unit for cooling air within said vehicle including a compressor, power transmitting means between said prime mover and said compressor, means including a clock for initiating operation of said prime mover at a preselected time, transmission means for driving said vehicle from said prime mover including a control means for preventing movement of said vehicle in one position of the control means, and interlock means operated by said control means for preventing said clock means from initiating operation of said prime mover in one position of said transmission control means, said first named power transmitting means comprising means for varying the speed of said compressor relative to the speed of said prime mover so as to control the output of said air conditioning unit.

12. In a vehicle, a prime mover, transmission means for driving said vehicle by said prime mover including a transmission control having means for preventing movement of said vehicle in one position of said control, an air conditioning unit for cooling air within said vehicle including a compressor, power transmitting means between said prime mover and said compressor, means including a clock for initiating operation of said prime mover at a preselected time, and means preventing unauthorized movement of said transmission control from said one position, said last named means being rendered operative by said clock.

13. In a vehicle having a passenger compartment, a prime mover, an air conditioning unit for cooling air within said compartment including a compressor, power transmitting means between said prime mover and said compressor, said unit including a fan means having an outlet arranged to discharge air into said passenger compartment, means including a clock for initiating operation of said prime mover at a preselected time, transmission means for driving said vehicle from said prime mover including a control means for preventing movement of said vehicle in one position of the control means, and interlock means operated by said control means for preventing said clock means from initiating operation of said prime mover in one position of said transmission control means.

References Cited in the file of this patent

UNITED STATES PATENTS

| | | |
|---|---|---|
| Re. 22,100 | Brace et al. | May 26, 1942 |
| 1,775,611 | White | Sept. 9, 1930 |
| 1,796,627 | Schmieding et al. | Mar. 17, 1931 |
| 1,956,978 | Natziger | May 1, 1934 |
| 2,031,139 | Ury | Feb. 18, 1936 |
| 2,175,830 | Davis | Oct. 10, 1939 |
| 2,344,864 | Griswold | Mar. 21, 1944 |
| 2,475,166 | Vanerka | July 5, 1949 |
| 2,534,273 | Kleist | Dec. 19, 1950 |
| 2,603,287 | Midgley | July 15, 1952 |
| 2,619,558 | Gallagher et al. | Nov. 25, 1952 |